United States Patent [19]

Grundy

[11] 4,171,838

[45] Oct. 23, 1979

[54] IMPROVEMENTS IN OR RELATING TO PROTECTION BARS FOR VEHICLES

[76] Inventor: William R. Grundy, 100 Windich St., Esperance, Australia, 6450

[21] Appl. No.: 870,744

[22] Filed: Jan. 19, 1978

[30] Foreign Application Priority Data

Jan. 20, 1977 [AU] Australia .......................... PC8799/77

[51] Int. Cl.² .............................................. B60R 19/00
[52] U.S. Cl. ..................................... 293/148; 403/391
[58] Field of Search ....................... 293/60, 63, 64–67, 293/69 V, 70, 71 A, 73–74, 75–79, 80–82, 87–90, 96–100, 101; 403/389, 390, 391, 405, 385, 400; 180/68 P

[56] References Cited

U.S. PATENT DOCUMENTS 3,438,667   4/1969   Davis ............................... 293/100 X
3,831,696   8/1974   Mittendorf et al. ................. 180/68 P

FOREIGN PATENT DOCUMENTS 1271369   7/1961   France ...................................... 293/97
 557664   2/1957   Italy ......................................... 403/391
 530341  12/1940   United Kingdom ..................... 403/391

Primary Examiner—Douglas C. Butler
Attorney, Agent, or Firm—Pearne, Gordon, Sessions, McCoy & Granger

[57] ABSTRACT

A protective framework or bar for a motor vehicle, the bar comprising spaced horizontal polycarbonate tubes having free unsupported ends, the tubes being joined and united to a pair of vertical steel bars adapted to be joined to the motor vehicle, the bars being joined by joining blocks adapted to be adjustably positioned along each of the bars.

6 Claims, 3 Drawing Figures

IMPROVEMENTS IN OR RELATING TO PROTECTION BARS FOR VEHICLES

This invention relates to improvements in or relating to protection bars for vehicles, and more particularly to those forms of bars and structures which are mounted on the front of vehicles such as cars and trucks to prevent or minimise damage to the vehicle in the event of a vehicle striking an unexpected object such as a kangaroo or other wild animal.

BACKGROUND OF THE INVENTION

These bars or structures which are in Australia commonly called kangaroo bars or bull bars are usually constructed of metal, of either round or square section tube of a size up to for example 50 to 76 millimeters. This then forms a very heavy structure fitted to the front of the vehicle, for example a passenger car, this structure being rigid and often heavy in relation to the vehicle and is attached by brackets or otherwise to the forward part of the vehicle, this being perhaps the engine sub-frame or chassis or the like.

Thus on the protection bar striking a solid object this impact is transmitted directly to the vehicle so that the impact force is absorbed by the vehicle and not by the bar itself. This then often causes structural damage of a major nature to the chassis or body of the vehicle, whereas the protection bar itself often remains undamaged due to its heavy solid structure.

Also due to the large weight placed at an extreme forward position of the vehicle, particularly on modern passenger cars there is an excess weight applied to the front of the vehicle and this often upsets the design, handling, steering and other road handling characteristics of the vehicle.

Hence it is an object of this invention to provide a protective bar or the like for vehicles, particularly passenger vehicles, and which bar will overcome one or more of the above problems associated with heavy metallic bars.

BRIEF DESCRIPTION OF THE INVENTION

Thus there is provided according to the invention a protective framework or bar for a motor vehicle, the bar being in general a rectangular framework constructed by members united together intermediate their length, the members being formed from one of the known rigid plastics materials, the framework being attached by brackets or the like to the chassis, sub-frame or other substantially solid point of the motor vehicle.

BRIEF DESCRIPTION OF THE DRAWINGS

In order to more fully describe the invention reference will now be made to the accompanying drawings in which.

DESCRIPTION OF THE PREFERRED EMBODIMENT

Figure 1:
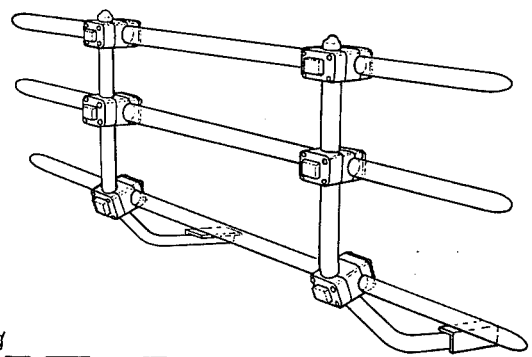
FIG. 1 is a perspective view from one side of the unit.

As shown the protection bar comprises a plurality of horizontal bars 1 joined by joining blocks 2 to a pair of vertical support bars 3. Preferably there are three horizontal bars having free ends, that is unsupported at their ends, made of a rigid plastics material. A preferred material is polycarbonate, and the bars are made of tubes of such material. The polycarbonate bars and tubes are extremely tough and durable with a degree of flexibility and resilience.

The joining blocks 2 securely unite the bars 1 to the support bars 3, and comprise a central block or spacer 4 of hard rubber or similar material having semi-circular grooves 5 and 6 on opposite sides thereof and extending at right angles to each other. A pair of end blocks or clamp blocks 7, 8 also having semi-circular grooves 9, 10 engage the bars 3 and 1 respectively, so that when the assembly is bolted together by bolts 11 the bars 1 and 3 are securely clamped to each other. Further, each of the blocks 7 and 8 has a thickness at least equal to about one-half the cross-sectional dimension of the engaged bars 1 and 3. Accordingly, when the assembly is bolted together, each of the blocks 7 and 8 engages the block 4 with the joined bars 1 and 3 respectively disposed therebetween to provide a substantially solid assembly of the blocks 4, 7, and 8.

Cover plates 12 and 13 of metal are applied over the blocks 7 and 8 and in order to protect the cover plates and the bolts 11 and their nuts 14, each of the blocks 7 and 8 are provided with a protrusion 15, which extends through a similarly shaped aperture 16 in the cover plates in interlocking engagement therewith.

The bars 3 are preferably tubular steel, and extend downwardly and outwardly to extend under the vehicle to which the unit is to be fitted, suitable clamps or brackets or mounting member 17 being provided. These are not shown in detail but will vary depending upon the type and make of vehicle to which the unit is to be fitted.

The blocks 7 and 8 are identical, as are the plates 12 and 13, and the block 4 is identical on opposite sides except that the grooves 5 and 6 are at right angles. Thus the joining blocks 2 are simple and economical to produce and assemble.

It will be seen that the protector bar is readily adaptable to any particular sized and shaped vehicle. The horizontal bars can be readily adjusted along the vertical bars to give the spacing for the height, headlamp clearance, aesthetic appearance, of the vehicle and the like. Also the vertical bars can be adjusted logitudinally along the horizontal bars to enable the attachment to various vehicles.

Hence many and varied vehicles can have the protection bar fitted by using standard components of horizontal and vertical bars, the easy adjustability and spacing both vertically and horizontally allowing the ready adaption to these vehicles.

In an alternative form members for the frame can be formed of either rod or tube of either square, rectangular, circular or other desired cross-section, with the members being either welded, fused, adhered or otherwise secured together to form the framework.

The framework can have the usual upper and lower horizontal members with vertical end members and as desired one or more intermediate members either being positioned vertically or forming angled struts as desired.

The frame can be attached to the vehicle by brackets either of plastic or of metal, which are then bolted to the appropriate anchorage on the chassis or sub-frame of the vehicle.

It will be realised that by this invention the protection bar or frame would be of extremely light weight compared to the prior art bars, and that the horizontal bars would have a degree of resilience to absorb the impact so that the impact is not directly transmitted to the chassis of the vehicle also due to the formation of the bar there would be a tendency for the bar to deflect and guide the animal away from the car so that less damage would be done to the car and also less injury to the animal due to deflection and guiding away from the car.

The protection bar would thus not effect the handling characteristics of the vehicle to any great extent, due to its lighter weight, particularly if the protection bar is formed of tubular members whether these be of circular, square, rectangular or other desired shapes.

The protection bar can thus be formed in any colour to match the vehicle, this colour being incorporated in the rigid plastic material during manufacture so that the horizontal bars would be of permanent colour to suit the vehicle. Also in this way the bar can be formed to conform to be of a more aesthetic appearance to the vehicle while still providing adequate protection to the vehicle in the event of a collision with an animal.

While the invention has been particularly described with reference to the attachment to the front of a vehicle, the unit can readily be attached to the rear of a vehicle to protect the vehicle from damage due to parking misjudgements not only by the driver of the vehicle to which the unit is attached, and also to protect the vehicle from rear end collisions. Also the unit can be attached to the rear of other vehicles, such as caravans, trailers or the like.

Also when the unit is attached to the front of vehicles, if desired the bars could be closed in with a fine mesh screen, to protect the front of the vehicle, and particularly the radiator core from being blocked by insects such as grasshoppers and the like.

In this way the bar could also be used as a protective bar at the front of towed vehicles, such as trailers, boat trailers, caravans and the like where the bar can be closed in by a protective screen or material to protect the front of the towed vehicle from material thrown up by the rear wheels of the towing vehicle.

Although various forms of the invention have been described in some detail it is to be realised that the invention is not to be limited there to but can include various modifications falling within the spirit and scope of the invention.

I claim:

1. A protective framework for a vehicle, said protective framework being of generally rectangular shape with a plurality of spaced horizontal bars joined intermediate their lengths to a plurality of spaced vertical bars adapted to be attached to a vehicle, characterized in that the horizontal bars are resilient and are adapted to deflect to absorb some of the forces of impact on the horizontal bars striking an object and that the horizontal bars are joined to the vertical bars by joining blocks, each of the joining blocks including a pair of substantially solid clamp blocks and a substantially solid, hard rubber spacer having grooves on opposite sides thereof and at right angles to each other, the horizontal and vertical bars each being clamped in one of the grooves and engaged by one of the clamp blocks, and mechanical means including a pair of cover plates for engaging associated clamp blocks of the joining block and means for connecting the cover plates to one another to secure the joining block together with the joined horizontal and vertical bars.

2. A protective framework for a vehicle as defined in claim 1, wherein the horizontal bars extend across the width of the vehicle and have free unsupported ends.

3. A protective framework for a vehicle as defined in claim 2, wherein the horizontal bars are formed of polycarbonate tube, and the vertical bars are of metal.

4. A protective framework for a vehicle as defined in claim 1, wherein each of the clamp blocks has a thickness at least equal to about one-half the cross-sectional dimension of the engaged bar.

5. A protective framework for a vehicle, said protective framework being of generally rectangular shape with a plurality of spaced horizontal bars joined intermediate their lengths to a plurality of spaced vertical bars adapted to be attached to a vehicle, characterized in that the horizontal bars are resilient and are adapted to deflect to absorb some of the forces of impact on the horizontal bars striking an object and that the horizontal bars are joined to the vertical bars by joining blocks, each of the joining blocks including a substantially solid, hard rubber spacer having grooves on opposite sides thereof and at right angles to each other, the horizontal and vertical bars being clamped in the grooves by substantially solid clamp blocks engaging each bar respectively, each of the clamp blocks including a clamp groove on one side thereof for receiving the engaged bar and a protrusion on the opposite side thereof, and each of the joining blocks including a pair of cover plates for interlocking engagement with associated clamp blocks of the joining block, each of the cover plates having an aperture through which the protrusion of the associated clamp block extends.

6. A protective framework for a vehicle as defined in claim 5, wherein each clamp block has a thickness at least equal to about one-half the cross-sectional dimension of the engaged bar, and each clamp block engages the spacer with the joined horizontal and vertical bars respectively disposed therebetween to provide a substantially solid assembly of the clamp blocks and spacer.

* * * * *

UNITED STATES PATENT AND TRADEMARK OFFICE
CERTIFICATE OF CORRECTION

PATENT NO. : 4,171,838
DATED : October 23, 1979
INVENTOR(S) : William R. Grundy

Page 1 of 2

Figure 2:
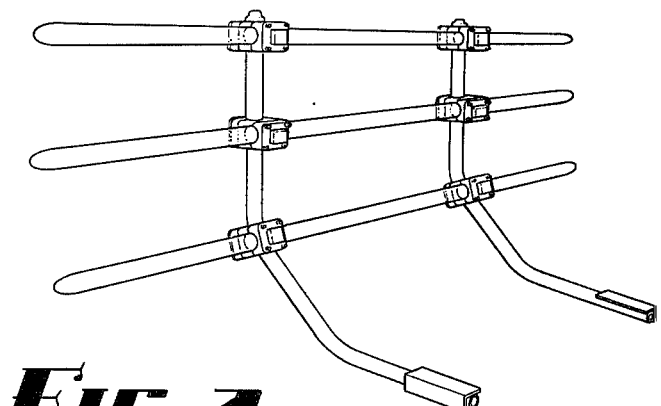
FIG. 2 is a perspective view from the other or vehicle side of the unit.
Figure 3:
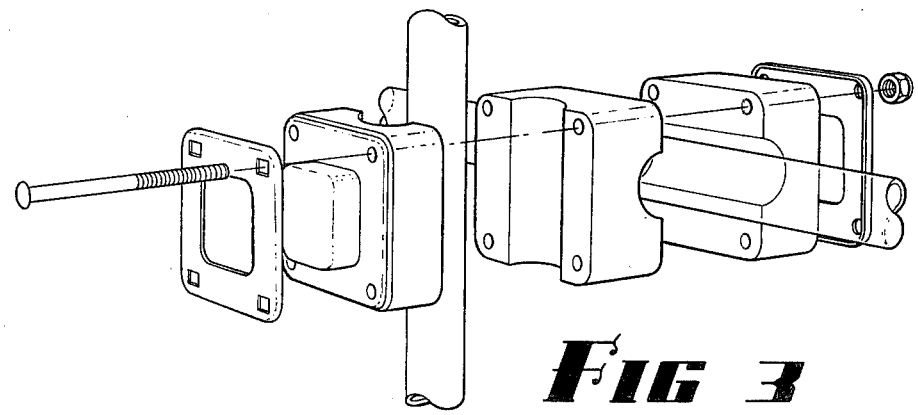
FIG. 3 is an exploded view of one of the joining members.
Figure 1:
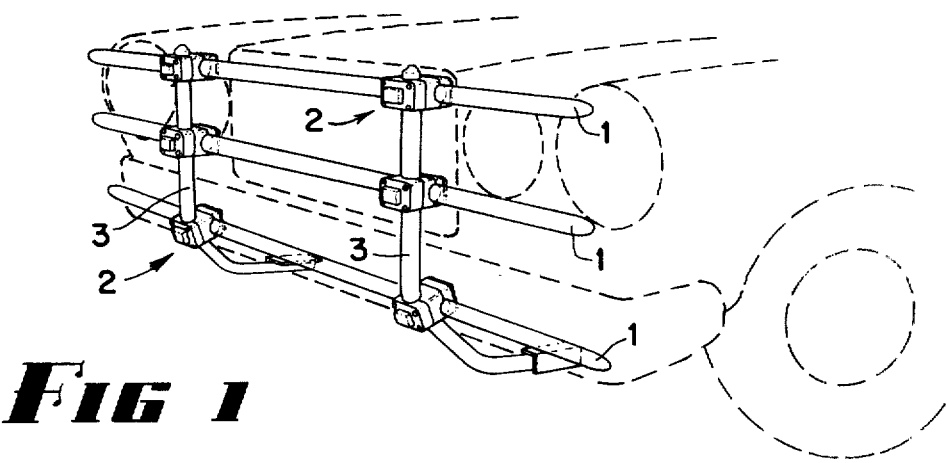
Figure 2:
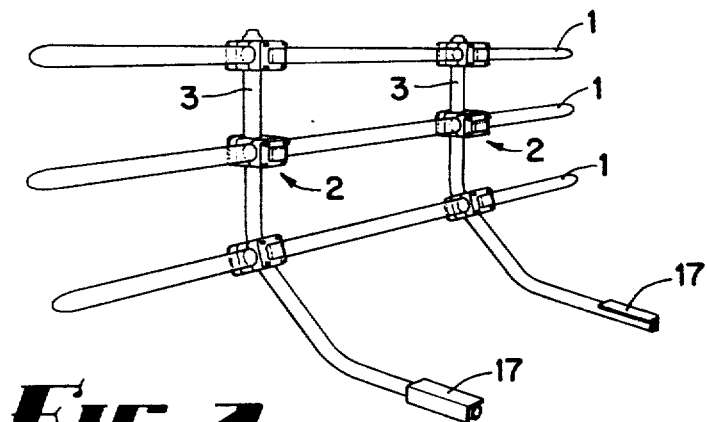
Figure 3:
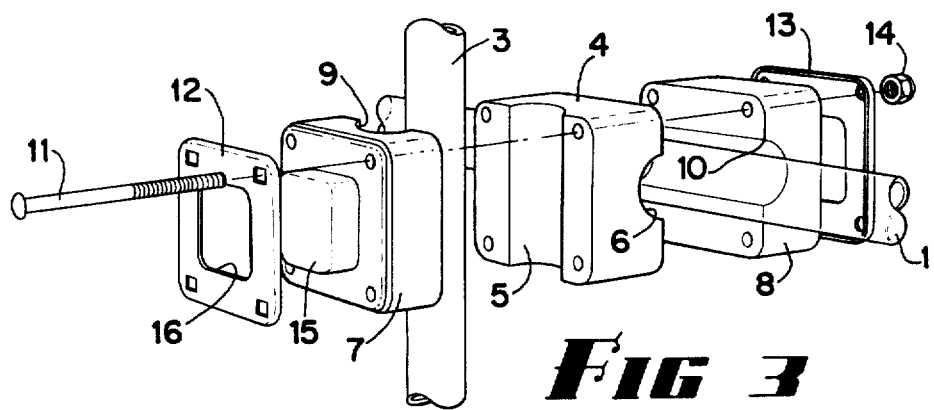

It is certified that error appears in the above-identified patent and that said Letters Patent is hereby corrected as shown below:

FIGS. 1, 2 and 3 should appear as shown on the attached sheet.

Signed and Sealed this

Twenty-first Day of September 1982

[SEAL]

Attest:

*Attesting Officer*

GERALD J. MOSSINGHOFF

*Commissioner of Patents and Trademarks*